United States Patent [19]

Palet

[11] Patent Number: 4,854,393

[45] Date of Patent: Aug. 8, 1989

[54] COMBINATION AIR HAMMER, WATER STREAM BLASTER AND LIQUID MIST DUST SUPPRESSOR

[76] Inventor: Timothy J. Palet, 4100 Highcrest, Irving, Tex. 75062

[21] Appl. No.: 128,166

[22] Filed: Dec. 3, 1987

[51] Int. Cl.⁴ .................. B25D 17/16; B25D 17/20
[52] U.S. Cl. .................................. 173/62; 173/74; 408/61
[58] Field of Search .............. 173/57, 61, 62, 74; 408/56, 57, 60, 61; 81/177.2, 177.6, 177.7

[56] References Cited

U.S. PATENT DOCUMENTS

| | | | |
|---|---|---|---|
| 819,755 | 5/1906 | Hellman et al. | 173/74 |
| 1,293,081 | 2/1919 | Gilman | 173/62 |
| 2,130,111 | 9/1938 | Whitney et al. | 81/467 |
| 3,343,434 | 9/1967 | Schroeder | 81/177.2 X |

Primary Examiner—Frank T. Yost
Assistant Examiner—James L. Wolfe
Attorney, Agent, or Firm—Warren H. Kintzinger

[57] ABSTRACT

An air hammer powered debris chisel headed tool having a water stream blaster outlet directing a high speed water stream forwardly closely adjacent and above the chisel head when valve controlled for use. Air misting outlets are also provided at the forward end of the tool to produce a dust debris supressing mist as the tool is being used in material removal such as asbestos dust abatement as asbestos is being removed in structures. A trigger control at the butt handle end of the tool controls on-off activation of the tool air hammer, and a lever on the butt handle has central settings from off to misting to combination misting and high speed water stream to high speed water stream alone.

14 Claims, 2 Drawing Sheets

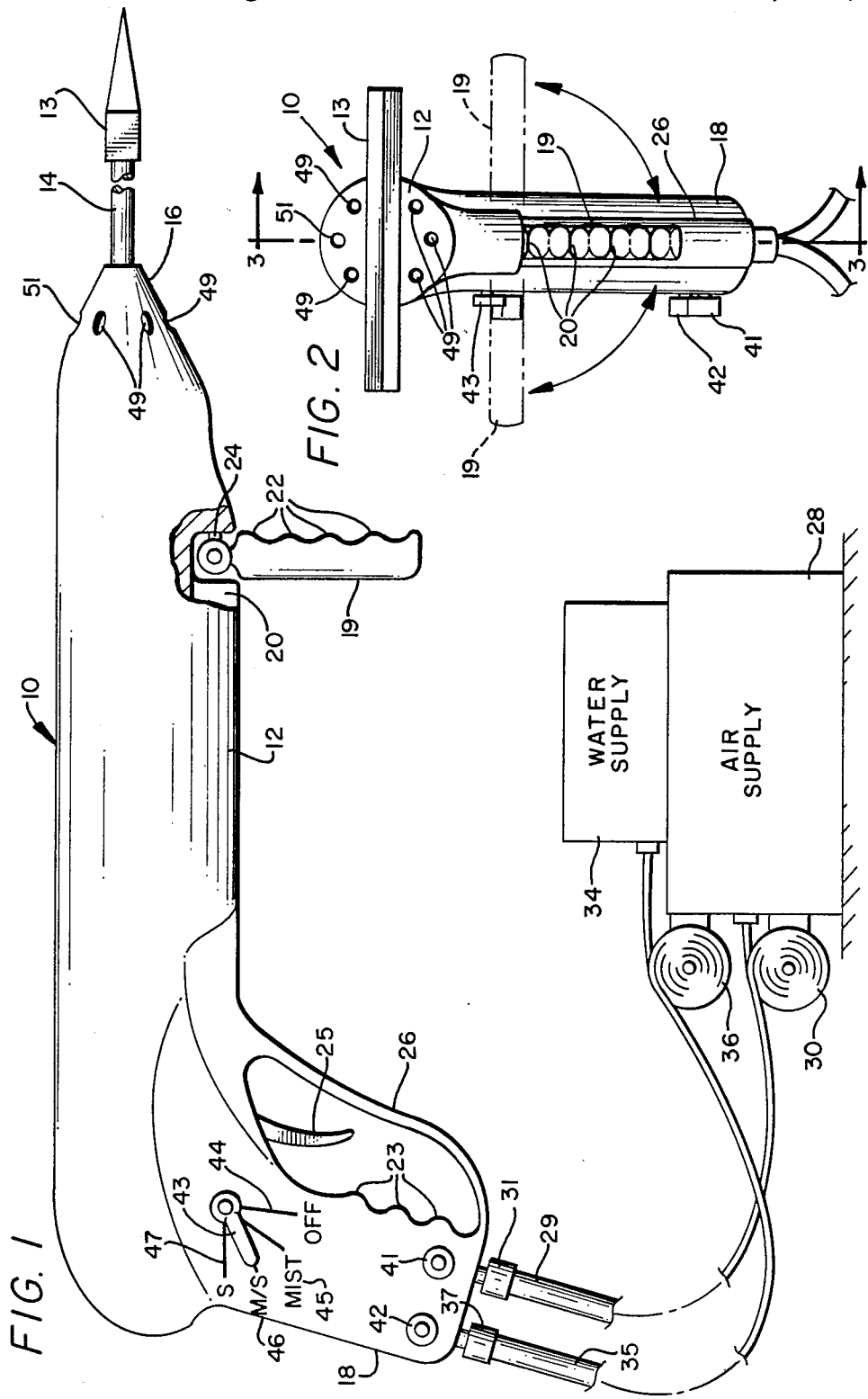

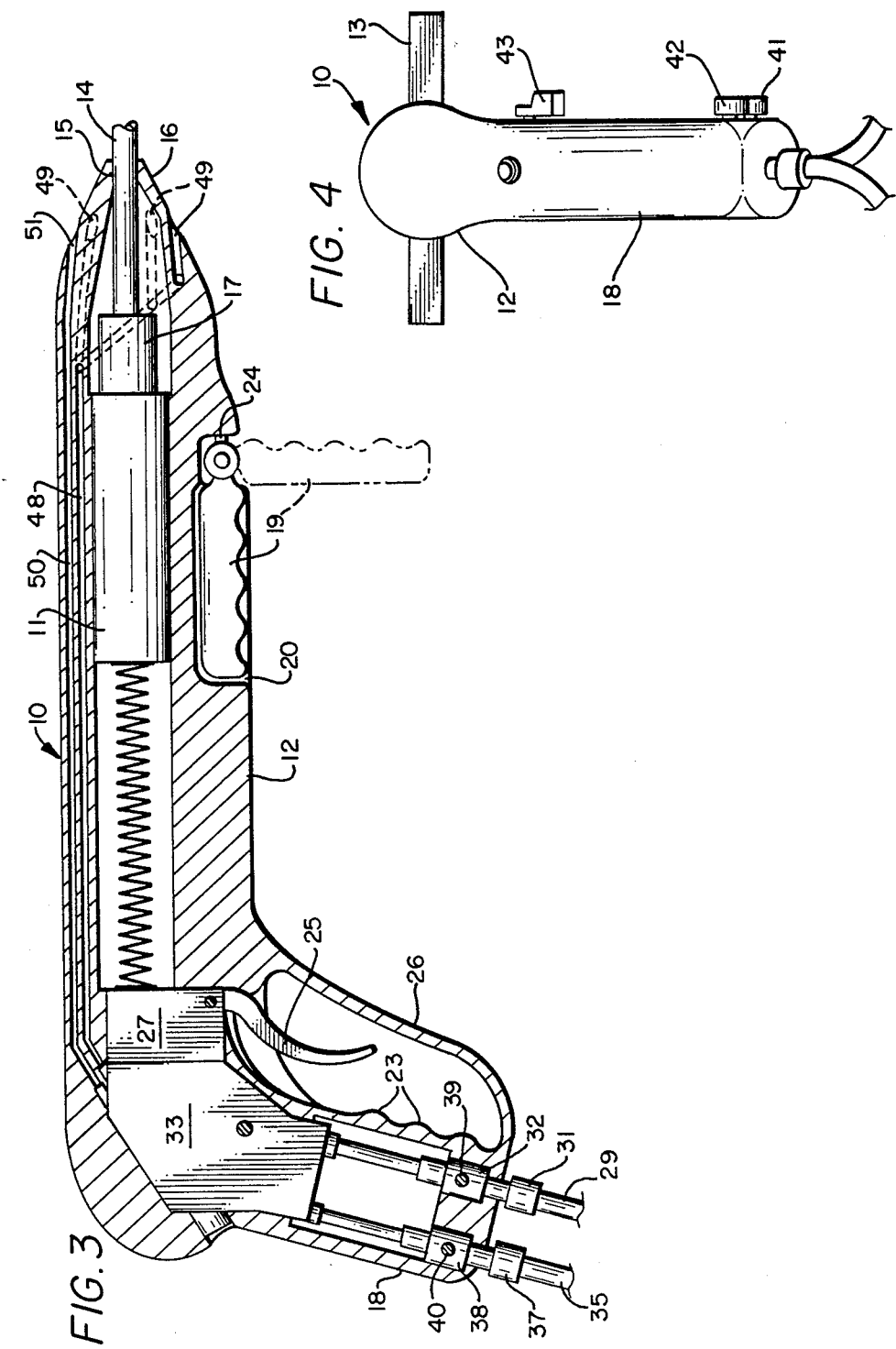

COMBINATION AIR HAMMER, WATER STREAM BLASTER AND LIQUID MIST DUST SUPPRESSOR

This invention relates in general to material removing tools, and more particularly, to a combination air hammer, water stream blaster and liquid mist dust supressor tool for use in debris removal from buildings and uses where dust is created.

There are many work situations where dust and dust abatement are severe problems with material treatment and/or removal and in the demolition industry. An illustrative case in point is in the asbestos abatement industry where asbestos must be removed from buildings. Asbestos is a fibrous mineral that has been mined and used in many materials including building materials. Asbestos has been used for fire proofing and insulating buildings, pipes and heating and cooling ducts, in shingles, floor tiles and many other products. This substance is particularly dangerous when the light, buoyant fibers are inhaled into the lungs leading to various diseases such as emphysema, asbestosis and lung cancer. Removal of asbestos from public buildings, schools, office buildings and many other buildings is becoming mandatory in that laws are requiring asbestos abatement to an increasing degree with the passage of time. When asbestos is being removed it is critically important that the creation of asbestos fiber dust be minimized and control confined so as to not increase hazards to health. It is important to provide effective protective control of dust created and/or disturbed as material is being removed from structures and one way to do this is by creating a mist in the work area to combine with dust weighting it down and making it more effectively settle down out of the air.

It is therefore a principal object of this invention to provide a material removed tool with a misting capability for misting the work area and any dust stirred up by the tool while in use.

Another object is to provide a material removal tool with an air hammer driven chisel and misting outlets directing mist to the chisel work area.

A further object is to provide such a material removal tool with a water stream high velocity blaster outlet.

Still another object is to provide such a material removal tool with the high velocity water stream directed forward and above the air hammer driven chisel.

Another object is to provide such a material removal tool having convenient tool holding handles and easy to use controls for trigger actuating the air hammer drive of the tool and a butt handle mounted lever for control settings from off to combination misting and high speed stream to high speed water stream alone.

Features of the invention useful in accomplishing the above objects include, in a combination air hammer, water stream blaster and liquid mist dust supressor tool, an air hammer powered debris material removal chisel headed tool having a water stream blaster outlet directing a high speed water stream forwardly closely adjacent and above the chisel head when valve controlled for use. Air misting outlets are also provided at the forward end of the tool to produce a dust debris supressing mist as the tool is being used in material removal such as asbestos dust abatement as asbestos is being removed from structures. A trigger control at the butt handle end of the tool controls on-off activation of the tool air hammer, and a lever on the butt handle has control settings from off to misting to combination misting and high speed water stream to high speed water stream alone.

A specific embodiment representing what is presently regarded as the best mode of carrying out the invention is illustrated in the accompanying drawings.

In the drawings:

FIG. 1 represents a side elevation view of the combination air hammer, water stream blaster and liquid mist dust supressor tool for debris removal shown schematically to be connected to an air supply and to a pressured water supply;

FIG. 2, a front elevation view of the tool;

FIG. 3, a cut away and sectioned side elevation view taken along line 3—3 of FIG. 2 showing internal detail of the combination air hammer, water stream blaster and liquid mist dust supressor tool; and, FIG. 4, a rear elevation view of the tool.

Referring to the drawings:

The combination air hammer, water stream blaster and liquid mist dust suppressor tool 10 of FIGS. 1-4 used for debris removal from structures such as asbestos previously installed in buildings is shown to have an air hammer 11 structure of standard construction enclosed within tool body 12. The air hammer 11 drives chisel 13 in a reciprocating hammer action with the chisel rod shank 14 extended through opening 15 in the tool nose 16 to air hammer chuck connector 17 at the forward end of the air hammer 11. This air powered demolotion tool has a butt handle 18 at the rear end and a forward fold down handle 19 that may be folded down from recess 20 about pivot structure 21 for convenience in holding the tool with both hands. It should be noted also that handle 19 may be pivoted to project out to either side from the tool body 12 for holding convenience in tool use. The forward handle 19 is provided hand grip ridges 22 for firm hand gripping, and the butt handle 18 is provided with hand grip ridges 23. Such pivoting of the tool front handle 19 to a side is with the pivot structure mounting shank 24 pivotal in its mounting in the tool body 12. The trigger 25 within trigger guard 26 is works trigger control 27 for trigger controlled valving of air for trigger activation of the air hammer 11.

The high pressure air for the tool 10 is provided from high pressure air tank 28 through air line 29 that can play off and on line coil reel 30 to fitting connection 31 on the bottom of butt handle 18 through valve 32 in the handle 18 on to the air and water mix and passage control valve 33. High pressure water is provided from high pressure water tank source 34 through water line 35 that can play off and on line coil reel 36 to fitting connection 37 on the bottom of butt handle 18 through valve 38 in the handle 18 on to the air and water mix and passage control valve 33. The valves 32 and 38 have valve stems 39 and 40, respectively, extending outward from the valve bodies within the handle to knobs 41 and 42 outside one side of the bottom of the butt handle 18.

The air and water mix and passage control valve 33 is located within the upper end of butt handle 18 and the rear end of the tool body 12 with a valve stem extending outwardly to a valve control setting lever 43 on the same side of the butt handle 18 as knobs 41 and 42 but spaced well above them. The valve control setting lever 43 is moveable from a valve "OFF" setting 44 to a misting "MIST" setting 45, to a combination misting and water stream blaster "M/S" setting 46 and a water stream blaster only "S" setting 47. A misting passage 48 extends from the air and water mix and passage control valve 33 at the rear of tool body 12 forward to the front of body 12 where it branches out to a plurality of misting outlets 49. A high pressure water stream passage 50 extends from the air and water mix and passage control valve 33 at the rear of tool body body 12 forward to water stream blaster outlet 51 at the front nose 16 end of the tool body 12 positioned and oriented to direct a high speed stream of material removing blaster water forwardly and above the chisel 13. When the valve control lever 43 is turned from the "OFF" setting 44 to the "MIST" setting 45 the air and water mix and passage control valve 33 mixes pressure air fed from air line 29 with water fed from water line 35 to produce mist propelled through passage 48 and its front end branches and on out the plurality of misting outlets 49. Simultaneously therewith at desired times the operator using the tool can work the trigger 25 activating trigger control 27 for air driving of the air hammer 11. When the valve control lever 43 is turned to the combination misting and water stream blaster "M/S" setting 46 mist is again propelled through passage 48 and on out the plurality of misting outlets 49 and at the same time high pressure water is fed to and through passage 50 and out outlet 51. When the lever 43 is turned to the water stream blaster only "S" setting 47 high pressure water is fed to and through passage 50 and out outlet 51. The operator using the tool can work the trigger 25 for air driving the air hammer 11 if desired with lever 43 in any of its setting positions for any material removal mode of operation. It should be noted further that a considerable rabge of hammer and chisel variations could be mounted at the front of the tool in place of the chisel 13 shown.

Whereas this invention has been described with respect to a single embodiment thereof, it should be realized that various changes may be made without departure from the essential contributions to the art made by the teachings hereof.

I claim:

1. A combination air hammer, water stream blaster and liquid mist dust suppressor tool comprising: an air hammer powered debris material work headed tool with a body having a forward working end and a rear control end; air misting outlet means at said forward working end of the tool body; high speed water stream outlet means at said forward working end of the tool body; pressured water source connection means and air pressure source connection means at said rear control end of the tool body; air valve control means for valved feeding of air to said air hammer; and water and air control valve containing means in the rear control end of said body connected to said pressured water source connection means and to said air pressure source connection means for feeding said air misting outlet means and for feeding pressured water to said high speed water stream outlet means.

2. The combination air hammer, water stream blaster and liquid mist dust suppressor tool of claim 1, wherein said air misting outlet means at the forward working end of the tool body is a plurality of misting outlets collectively directed to project a cloud of mist in the work area of the work headed tool; and mist passage means extended from said water and air control valve containing means to said air misting outlet means.

3. The combination air hammer, water stream blaster and liquid mist dust suppressor tool of claim 2, wherein said high speed water stream outlet means is a single water stream outlet; and high pressure water passage means is extended from said water and air control valve containing means to said single water outlet.

4. The combination air hammer, water stream blaster and liquid mist dust suppressor tool of claim 3, wherein said water and air control valve containing means includes control element means settable to off, misting, a combination of misting and high speed water stream, and high speed water stream alone.

5. The combination air hammer, water stream blaster and liquid mist dust suppressor tool of claim 4, wherein said air valve control means for valved feeding of air to said air hammer is a trigger action valve.

6. The combination air hammer, water stream blaster and liquid mist dust suppressor tool of claim 5, wherein said rear control end includes a depending butt handle with said control element means is valve means connectable to a lever at a side of said depending butt handle settable to off, misting, a combination of misting and high speed water stream, and high speed water stream alone.

7. The combination air hammer, water stream blaster and liquid mist dust suppressor tool of claim 6, wherein said trigger action valve is activated by a trigger tang protected by a trigger guard at the front of said depending butt handle.

8. The combination air hammer, water stream blaster and liquid mist dust suppressor tool of claim 7, wherein said tool body includes a bottom recess sized to receive a fold out handle; said fold out handle pivotally mounted for pivotal movement from a retracted state to a downward extended state.

9. The combination air hammer, water stream blaster and liquid mist dust suppressor tool of claim 8, wherein side opening means from said bottom recess is provided permitting pivotal movement of said fold out handle to a lateral side of said tool.

10. The combination air hammer, water stream blaster and liquid mist dust suppressor tool of claim 8, with said fold out handle pivotally mounted to be pivotal to project out to either side from the tool body for holding convenience in tool use.

11. The combination air hammer, water stream blaster and liquid mist dust suppressor tool of claim 10, wherein said single water stream outlet is above the work head of said tool.

12. The combination air hammer, water stream blaster and liquid mist dust suppressor tool of claim 11, wherein the work head of said tool is an air hammer driven chisel.

13. The combination air hammer, water stream blaster and liquid mist dust suppressor tool of claim 12, wherein misting outlets of said plurality of misting outlets are both above and below the work head of said tool.

14. The combination air hammer, water stream blaster and liquid mist dust suppressor tool of claim 13, wherein on/off valve means with control knobs are provided in the bottom of said butt handle for both the pressured water and the pressured air.

* * * * *